United States Patent
Ahn et al.

(10) Patent No.: US 11,978,854 B2
(45) Date of Patent: May 7, 2024

(54) COMPOSITION FOR POLYMER ELECTROLYTE AND LITHIUM SECONDARY BATTERY INCLUDING POLYMER ELECTROLYTE PREPARED THEREFROM

(71) Applicant: LG CHEM, LTD., Seoul (KR)

(72) Inventors: Kyoung Ho Ahn, Daejeon (KR); Sol Ji Park, Daejeon (KR); Jun Hyeok Han, Daejeon (KR); Chul Haeng Lee, Daejeon (KR); Jung Hoon Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 550 days.

(21) Appl. No.: 17/281,367

(22) PCT Filed: Oct. 4, 2019

(86) PCT No.: PCT/KR2019/013032
§ 371 (c)(1),
(2) Date: Mar. 30, 2021

(87) PCT Pub. No.: WO2020/071850
PCT Pub. Date: Apr. 9, 2020

(65) Prior Publication Data
US 2022/0037695 A1 Feb. 3, 2022

(30) Foreign Application Priority Data

Oct. 5, 2018 (KR) .......................... 10-2018-0119243
Oct. 2, 2019 (KR) .......................... 10-2019-0122404

(51) Int. Cl.
*H01M 10/0565* (2010.01)
*C08F 22/22* (2006.01)
*H01M 10/0525* (2010.01)
*H01M 10/0568* (2010.01)

(52) U.S. Cl.
CPC ......... *H01M 10/0565* (2013.01); *C08F 22/22* (2013.01); *H01M 10/0525* (2013.01); *H01M 10/0568* (2013.01); *H01M 2300/0091* (2013.01)

(58) Field of Classification Search
CPC ...... C08F 22/1006; C08F 22/22; C08G 18/42; C08G 18/81; C08L 75/06; C08L 75/16; H01M 10/0525; H01M 10/0565; H01M 10/0568; H01M 2300/0082; H01M 2300/0085; H01M 2300/0091; Y02E 60/10
See application file for complete search history.

(56) References Cited

U.S. PATENT DOCUMENTS

| | | |
|---|---|---|
| 10,243,239 B1 | 3/2019 | Ahn et al. |
| 2013/0136998 A1 | 5/2013 | Hwang et al. |
| 2016/0204468 A1 | 7/2016 | Makino et al. |
| 2017/0229735 A1 | 8/2017 | Ahn et al. |
| 2018/0342767 A1 | 11/2018 | Ahn et al. |
| 2020/0181308 A1 | 6/2020 | Makino et al. |
| 2020/0220212 A1 | 7/2020 | Ahn et al. |
| 2020/0227781 A1 | 7/2020 | Ahn et al. |

FOREIGN PATENT DOCUMENTS

| | | |
|---|---|---|
| CN | 108028424 A | 5/2018 |
| EP | 3203565 A1 | 8/2017 |
| EP | 3361546 A1 | 8/2018 |
| EP | 3654436 A1 | 5/2020 |
| JP | 2001-297948 A | 10/2001 |
| JP | 2011-154853 A | 8/2011 |
| JP | 2013-008611 A | 1/2013 |
| KR | 10-2013-0058403 A | 6/2013 |
| KR | 10-2016-0040128 A | 4/2016 |
| KR | 10-1737223 B1 | 5/2017 |
| KR | 10-1828127 B1 | 2/2018 |
| KR | 10-2018-0026358 A | 3/2018 |
| KR | 10-1842375 B1 | 3/2018 |

OTHER PUBLICATIONS

International Search Report (with partial translation) and Written Opinion issued in corresponding International Patent Application No. PCT/KR2019/013032, dated Jan. 13, 2020.
Bao et al., "Polycarbonate-based polyurethane as a polymer electrolyte matrix for all-solid-state lithium batteries," Journal of Power Sources (2018) vol. 389, pp. 84-92.
Zhang et al., "Recent advances in solid polymer electrolytes for lithium batteries," Nano Research, 2017, vol. 10, No. 12, pp. 4139-4174.
Devaux et al., "Crosslinked perfluoropolyether solid electrolytes for lithium ion transport," Solid State Ionics (2017) vol. 310, pp. 71-80.
Extended European Search Report issued by the European Patent Office dated Oct. 1, 2021 in a corresponding European Patent Application No. 19868717.1.

*Primary Examiner* — Victoria H Lynch
(74) *Attorney, Agent, or Firm* — Morgan, Lewis & Bockius LLP

(57) ABSTRACT

The present invention relates to a composition for a polymer electrolyte which includes a polymerizable oligomer capable of forming an excellent crosslink during a polymerization reaction. Also, the present invention relates to a polymer electrolyte, which may ensure high oxidation stability and ionic conductivity by using the composition for a polymer electrolyte, and a lithium secondary battery including the same.

10 Claims, No Drawings

COMPOSITION FOR POLYMER ELECTROLYTE AND LITHIUM SECONDARY BATTERY INCLUDING POLYMER ELECTROLYTE PREPARED THEREFROM

CROSS-REFERENCE TO RELATED APPLICATIONS

This application claims the benefit of Korean Patent Application Nos. 2018-0119243, filed on Oct. 5, 2018, and 2019-0122404, filed on Oct. 2, 2019, in the Korean Intellectual Property Office, the disclosure of which is incorporated herein in its entirety by reference.

TECHNICAL FIELD

The present invention relates to a composition for a polymer electrolyte and a lithium secondary battery including a polymer electrolyte prepared therefrom.

BACKGROUND ART

Recently, there is a growing demand for high performance, high stability secondary batteries as electric, electronic, communication, and computer industries have rapidly developed. Particularly, in line with miniaturization and lightweight trends of electronic and communication devices, thin-film and miniaturized lithium secondary batteries, as core components in this field, are required.

Lithium secondary batteries may be divided into a lithium ion battery using a liquid electrolyte and a lithium polymer battery using a polymer electrolyte depending on the electrolyte used.

The lithium ion battery is advantageous in that it has high capacity, but the lithium ion battery is disadvantageous in that, since the liquid electrolyte containing a lithium salt is used, there is a risk of leakage and explosion and battery design is complicated to prepare for the risk.

In contrast, with respect to the lithium polymer battery, since a gel polymer electrolyte containing a liquid electrolyte solution or a solid polymer electrolyte is used as the electrolyte, stability is improved and, simultaneously, flexibility is obtained, and thus, the lithium polymer battery may be developed in various forms, for example, in the form of small or thin-film batteries.

Recently, development of an all-solid secondary battery using the solid polymer electrolyte having higher stability than the gel polymer electrolyte containing a liquid electrolyte solution has emerged. Therefore, there is a need to develop a solid polymer electrolyte having a new configuration in which interfacial resistance is low due to an excellent effect of interfacial contact with an electrode and ionic conductivity is high.

PRIOR ART DOCUMENT

Korean Patent No. 1842375
Japanese Patent Application Laid-open Publication No. 2013-008611

DISCLOSURE OF THE INVENTION

Technical Problem

An aspect of the present invention provides a composition for a polymer electrolyte which includes a polymerizable oligomer capable of forming an excellent crosslink during a polymerization reaction.

Another aspect of the present invention provides a polymer electrolyte which may ensure high oxidation stability and ionic conductivity by using the composition for a polymer electrolyte.

Another aspect of the present invention provides a lithium secondary battery including the polymer electrolyte.

Technical Solution

According to an aspect of the present invention, there is provided a composition for a polymer electrolyte which includes:
a lithium salt, an organic solvent, a polymerization initiator, and a polymerizable oligomer,
wherein the polymerizable oligomer includes at least one of an oligomer represented by Formula 1 and an oligomer represented by Formula 2 below.

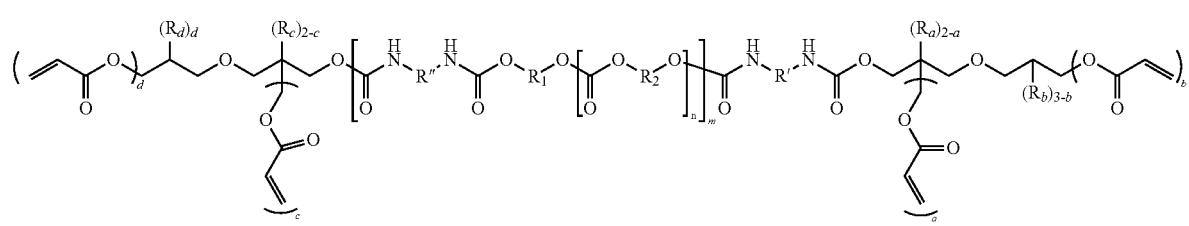

[Formula 1]

In Formula 1,

R' and R" are each independently an aliphatic hydrocarbon group or an aromatic hydrocarbon group, $R_1$ and $R_2$ are each independently a substituted or unsubstituted alkylene group having 1 to 10 carbon atoms, a substituted or unsubstituted cycloalkylene group having 4 to 20 carbon atoms, a substituted or unsubstituted arylene group having 6 to 20 carbon atoms, a substituted or unsubstituted heterocycloalkylene group having 2 to 20 carbon atoms, —CO—O—R— (where R is an alkylene group having 1 to 10 carbon atoms), —$R_o$—CO— (where $R_o$ is an alkylene group having 1 to 10 carbon atoms), or —$R_3$—O—$R_4$— (where $R_3$ and $R_4$ are each independently a substituted or unsubstituted alkylene group having 1 to 10 carbon atoms), $R_a$, $R_b$, $R_c$, and $R_d$ are each independently hydrogen or an alkyl group having 1 to 3 carbon atoms, n and m are the numbers of repeating units,
wherein n is an integer of 1 to 100, and
m is an integer of 1 to 100,
a and c are each independently an integer of 0 to 2, and
b and d are each independently an integer of 1 to 3.

may ensure high ionic conductivity at room temperature. Thus, if the oligomer represented by Formula 1 or Formula 2 is used, a polymer electrolyte having excellent mechanical properties as well as excellent oxidation stability and ionic conductivity may be achieved. Also, a lithium secondary

[Formula 2]

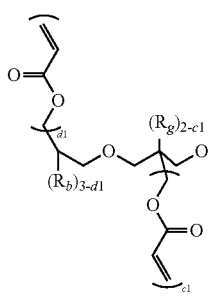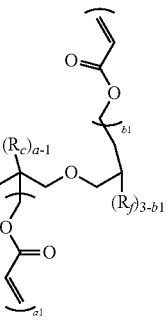

In Formula 2, $R_5$, $R_6$, $R_7$, and $R_8$ are each independently a substituted or unsubstituted alkylene group having 1 to 10 carbon atoms, a substituted or unsubstituted cycloalkylene group having 4 to 20 carbon atoms, a substituted or unsubstituted arylene group having 6 to 20 carbon atoms, a substituted or unsubstituted heterocycloalkylene group having 2 to 20 carbon atoms, —CO—O—$R_j$— (where $R_j$ is an alkylene group having 1 to 10 carbon atoms), —$R_k$—CO— (where $R_k$ is an alkylene group having 1 to 10 carbon atoms), or —$R_{12}$—O—$R_{13}$— (where $R_{12}$ and $R_{13}$ are each independently a substituted or unsubstituted alkylene group having 1 to 10 carbon atoms), $R_9$, $R_{10}$, and $R_{11}$ are each independently an aliphatic hydrocarbon group or an aromatic hydrocarbon group, $R_e$, $R_f$, $R_g$, and $R_h$ are each independently hydrogen or an alkyl group having 1 to 3 carbon atoms, o, p, and q are the numbers of repeating units,
wherein o is an integer of 1 to 100,
p is an integer of 1 to 100, and
q is an integer of 1 to 100,
a1 and c1 are each independently an integer of 0 to 2, and
b1 and d1 are each independently an integer of 1 to 3.

According to another aspect of the present invention, there is provided a polymer electrolyte prepared by polymerization of the composition for a polymer electrolyte of the present invention.

According to another aspect of the present invention, there is provided a lithium secondary battery including a positive electrode including a positive electrode active material; a negative electrode including a negative electrode active material; a separator disposed between the negative electrode and the positive electrode; and the polymer electrolyte of the present invention.

Advantageous Effects

Since an oligomer represented by Formula 1 or Formula 2, which is included in a polymer electrolyte of the present invention, contains a polycarbonate group as a repeating unit in its structure and at least one acrylate group at its end, the oligomer represented by Formula 1 or Formula 2 may form an excellent crosslink during a polymerization reaction and battery having excellent overall performance may be achieved by including the polymer electrolyte.

MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Before describing the present invention, the expressions "a" and "b" in the description of "a to b carbon atoms" in the specification each denote the number of carbon atoms included in a specific functional group. That is, the functional group may include "a" to "b" carbon atoms. For example, the expression "alkylene group having 1 to 5 carbon atoms" denotes an alkylene group including 1 to 5 carbon atoms, that is, —CH$_2$—, —CH$_2$CH$_2$—, —CH$_2$CH$_2$CH$_2$—, —CH$_2$(CH$_3$)CH—, —CH(CH$_3$)CH$_2$—, and —CH(CH$_3$)CH$_2$CH$_2$—.

Also, in the present specification, the expression "alkylene group" denotes a branched or unbranched divalent unsaturated hydrocarbon group. In an embodiment, the alkylene group may be substituted or unsubstituted. The alkylene group includes a methylene group, an ethylene group, a propylene group, an isopropylene group, a butylene group, an isobutylene group, a tert-butylene group, a pentylene group, and 3-pentylene group, but the alkylene group is not limited thereto, and each thereof may be optionally substituted in another exemplary embodiment.

Furthermore, unless otherwise defined in the specification, the expression "substitution" denotes that at least one hydrogen bonded to carbon is substituted with an element other than hydrogen, for example, an alkyl group having 1 to 5 carbon atoms or a fluorine element.

Also, it will be further understood that the terms "include," "comprise," or "have" in this specification specify the presence of stated features, numbers, steps, elements, or combinations thereof, but do not preclude the presence or addition of one or more other features, numbers, steps, elements, or combinations thereof.

Unless otherwise defined in the specification, the expression "molecular weight" denotes a weight-average molecular weight (Mw) of a polymer or oligomer which is measured using gel permeation chromatography (GPC).

Composition for Polymer Electrolyte

A composition for a polymer electrolyte according to the present invention includes:

a lithium salt, an organic solvent, a polymerization initiator, and a polymerizable oligomer, wherein the polymerizable oligomer includes at least one of an oligomer represented by Formula 1 and an oligomer represented by Formula 2 below.

[Formula 1]

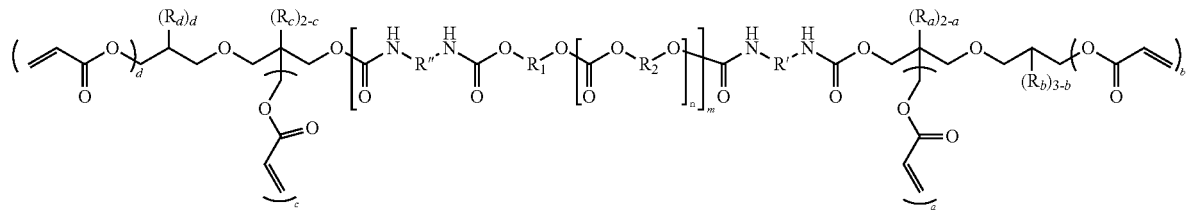

In Formula 1,

R' and R" are each independently an aliphatic hydrocarbon group or an aromatic hydrocarbon group, $R_1$ and $R_2$ are each independently a substituted or unsubstituted alkylene group having 1 to 10 carbon atoms, a substituted or unsubstituted cycloalkylene group having 4 to 20 carbon atoms, a substituted or unsubstituted arylene group having 6 to 20 carbon atoms, a substituted or unsubstituted heterocycloalkylene group having 2 to 20 carbon atoms, —CO—O—R— (where R is an alkylene group having 1 to 10 carbon atoms), —$R_o$—CO— (where $R_o$ is an alkylene group having 1 to 10 carbon atoms), or —$R_3$—O—$R_4$— (where $R_3$ and $R_4$ are each independently a substituted or unsubstituted alkylene group having 1 to 10 carbon atoms), $R_a$, $R_b$, $R_c$, and $R_d$ are each independently hydrogen or an alkyl group having 1 to 3 carbon atoms, n and m are the numbers of repeating units, wherein n is an integer of 1 to 100, and m is an integer of 1 to 100, a and c are each independently an integer of 0 to 2, and b and d are each independently an integer of 1 to 3.

[Formula 2]

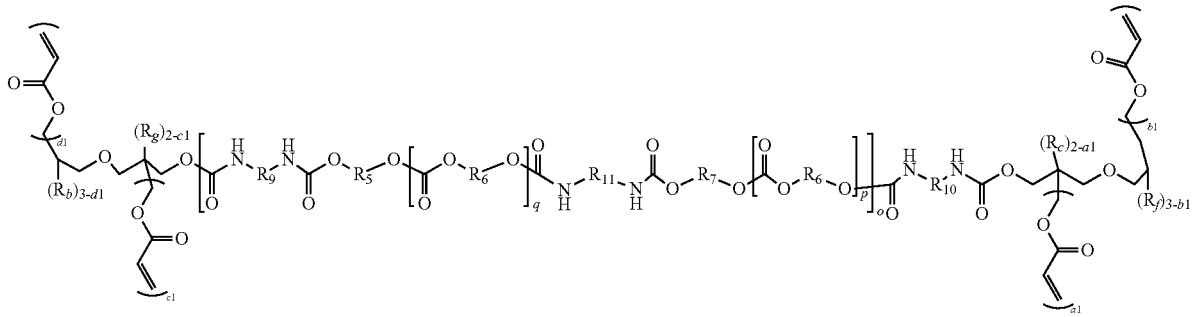

In Formula 2, $R_5$, $R_6$, $R_7$, and $R_8$ are each independently a substituted or unsubstituted alkylene group having 1 to 10 carbon atoms, a substituted or unsubstituted cycloalkylene group having 4 to 20 carbon atoms, a substituted or unsubstituted arylene group having 6 to 20 carbon atoms, a substituted or unsubstituted heterocycloalkylene group having 2 to 20 carbon atoms, —CO—O—$R_j$— (where $R_j$ is an alkylene group having 1 to 10 carbon atoms), —$R_k$—CO— (where $R_k$ is an alkylene group having 1 to 10 carbon atoms), or —$R_{12}$—O—$R_{13}$— (where $R_{12}$ and $R_{13}$ are each independently a substituted or unsubstituted alkylene group having 1 to 10 carbon atoms), $R_9$, $R_{10}$, and $R_{11}$ are each independently an aliphatic hydrocarbon group or an aromatic hydrocarbon group, $R_e$, $R_f$, $R_g$, and $R_h$ are each independently hydrogen or an alkyl group having 1 to 3 carbon atoms, o, p, and q are the numbers of repeating units, wherein o is an integer of 1 to 100, p is an integer of 1 to 100, and q is an integer of 1 to 100, a1 and c1 are each independently an integer of 0 to 2, and b1 and d1 are each independently an integer of 1 to 3.

(1) Lithium Salt

The lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $B_{10}Cl_{10}^-$, $AlCl_4^-$, $AlO_4^-$, $PF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $C_4F_9SO_3^-$, $AsF_6^-$, $SbF_6^-$, $CF_3SO_3^-$, $CH_3CO_2^-$, $CF_3CO_2^-$, $CH_3SO_3^-$, $(FSO_2)_2N^-$, $(CF_3CF_2SO_2)_2N^-$, $(CF_3SO_2)_2N^-$, $CF_3CF_2SO_3^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, and $SCN^-$ as an anion, and, in addition thereto, a lithium salt typically used in an electrolyte solution of a lithium secondary battery may be used without limitation.

Specifically, the lithium salt may include a single material selected from the group consisting of LiCl, LiBr, LiI, LiBF$_4$, LiClO$_4$, LiB$_{10}$Cl$_{10}$, LiAlCl$_4$, LiAlO$_4$, LiPF$_6$, LiAsF$_6$, LiSbF$_6$, LiCF$_3$SO$_3$, LiCH$_3$CO$_2$, LiCF$_3$CO$_2$, LiCH$_3$SO$_3$, lithium bis(fluorosulfonyl)imide (LiFSI, LiN(SO$_2$F)$_2$), lithium bis(perfluoroethanesulfonyl) imide (LiBETI, LiN(SO$_2$CF$_2$CF$_3$)$_2$), and lithium bis(trifluoromethanesulfonyl) imide (LiTFSI, LiN(SO$_2$CF$_3$)$_2$) or a mixture of two or more thereof, and, more specifically, the lithium salt may include at least one of LiPF$_6$, LiFSI, and LiTFSI.

The lithium salt may be appropriately changed in a normally usable range, but may be included in a concentration of 0.8 M to 5 M, for example, 1.0 M to 4 M in the composition for a polymer electrolyte to obtain an optimum effect of forming a film for preventing corrosion of a surface of an electrode.

In a case in which the concentration of the lithium salt satisfies the above range, high lithium cation ($Li^+$) transfer characteristics (that is, cation transference number) may be secured due to an increase in lithium cations present in a polymer electrolyte prepared by polymerization of the composition for a polymer electrolyte, and an effect of reducing diffusion resistance of lithium ions may be achieved to obtain an effect of improving cycle capacity characteristics.

That is, if the concentration of the lithium salt is 0.8 M or more, Li-ion depletion during high-rate charge and discharge may be prevented, and, furthermore, an increase in resistance may be suppressed. Also, in a case in which the concentration of the lithium salt is 5 M or less, an increase in viscosity of the electrolyte may be suppressed while securing moving speed of the lithium ions at the same time. If the maximum concentration of the lithium salt is greater than 5 M, since viscosity of the composition for a polymer electrolyte is excessively increased to degrade electrolyte wetting, overall performance of the secondary battery may be degraded.

(2) Organic Solvent

The organic solvent is not particularly limited as long as it is a nonvolatile organic solvent or a volatile organic solvent having a low boiling point so that it is easily removed by heating, but it is desirable to use one, in which a side reaction or decomposition may be minimized during polymerization for curing, particularly, a solvent which does not react with a solid electrolyte or active material and does not decompose these.

Specifically, the organic solvent may include at least one solvent selected from the group consisting of N,N'-dimethylacetamide, N-methyl-2-pyrrolidone (hereinafter, abbreviated as "NMP"), dimethyl sulfoxide (DMSO), N,N-dimethylformamide (DMF), acetonitrile (AN), propylene carbonate (PC), ethylene carbonate (EC), butylene carbonate (BC), dimethyl carbonate (DMC), diethyl carbonate (DEC), ethylmethyl carbonate (EMC), fluoroethylene carbonate (FEC), γ-butyrolactone (GBL), 1,2-dimethoxy ethane, tetrahydroxyfuran, 2-methyl tetrahydrofuran (THF), dimethyl sulfoxide, 1,3-dioxolane (DOL), 1,4-dioxane, formamide, dimethylformamide, dioxolane, acetonitrile, nitromethane, methyl formate, ethyl acetate (EA), ethyl propionate (EP), methyl acetate (MA), methyl propionate (MP), dimethoxyethane (DME), diethyl ether, trimethoxy methane, triglyme, tetraglyme, sulfolane, methyl sulfolane, and 1,3-dimethyl-2-imidazolidinone.

More specifically, in order to facilitate the removal of the organic solvent, it is desirable that the organic solvent includes an organic solvent having a low boiling point, such as acetonitrile, or a volatile organic solvent such as N-methyl-2-pyrrolidone.

An amount of the organic solvent used is not particularly limited as long as the organic solvent is used in an amount such that the polymerizable oligomer and the lithium salt are uniformly mixed and the mixture may then be coated to a uniform thickness, but the organic solvent is preferably used in an amount as small as possible so as to facilitate the removal after coating the composition for a polymer electrolyte.

Specifically, the organic solvent may be used in an amount of about 5 parts by weight to about 2,000 parts by weight, particularly 30 parts by weight to 10,000 parts by weight, and more particularly 40 parts by weight to 900 parts by weight based on 100 parts by weight of a total solid content including the lithium salt and the oligomer represented by Formula 1 or the oligomer represented by Formula 2. In a case in which the organic solvent is used in an amount of 30 parts by weight or less to prepare a composition for a polymer electrolyte in a thick slurry state, fluidity may be increased by increasing solubility by slightly applying heat at 45° C. or less to facilitate coating.

In a case in which the amount of the organic solvent used is within the above range, since the composition for a polymer electrolyte may be uniformly coated to a sufficient thickness and the organic solvent may be easily removed during the preparation of the polymer electrolyte, a reduction in the mechanical strength of the polymer electrolyte due to the residual organic solvent may be prevented.

(3) Polymerizable Oligomer

The polymerizable oligomer included in the composition for a polymer electrolyte of the present invention is a compound having a crosslinkable substituent which may form a polymer matrix, a basic skeleton of the polymer electrolyte, while being oxidized by polymerization, wherein it includes at least one oligomer of oligomers represented by the following Formula 1 or Formula 2 which contains at least one acrylate group at its end.

O—$R_j$— (where $R_j$ is an alkylene group having 1 to 10 carbon atoms), —$R_k$—CO— (where $R_k$ is an alkylene group having 1 to 10 carbon atoms), or —$R_{12}$—O—$R_{13}$— (where $R_{12}$ and $R_{13}$ are each independently a substituted or unsubstituted alkylene group having 1 to 10 carbon atoms),

[Formula 1]

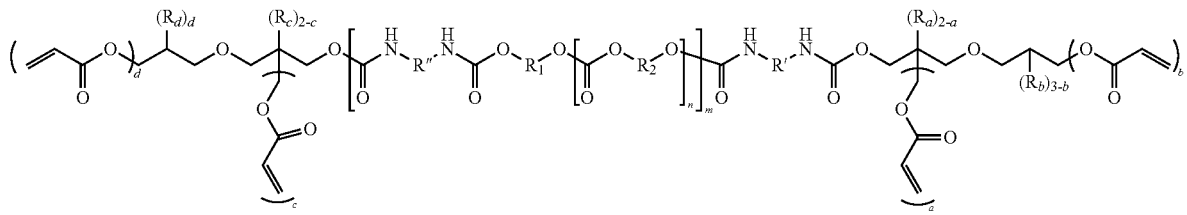

In Formula 1,
R' and R" are each independently an aliphatic hydrocarbon group or an aromatic hydrocarbon group,
$R_1$ and $R_2$ are each independently a substituted or unsubstituted alkylene group having 1 to 10 carbon atoms, a substituted or unsubstituted cycloalkylene group having 4 to 20 carbon atoms, a substituted or unsubstituted arylene group having 6 to 20 carbon atoms, a substituted or unsubstituted heterocycloalkylene group having 2 to 20 carbon atoms, —CO—O—R— (where R is an alkylene group having 1 to 10 carbon atoms), —$R_o$—CO— (where $R_o$ is an alkylene group having 1 to 10 carbon atoms), or —$R_3$—O—$R_4$— (where $R_3$ and $R_4$ are each independently a substituted or unsubstituted alkylene group having 1 to 10 carbon atoms),
$R_a$, $R_b$, $R_c$, and $R_d$ are each independently hydrogen or an alkyl group having 1 to 3 carbon atoms,
n and m are the numbers of repeating units,
wherein n is an integer of 1 to 100, and
m is an integer of 1 to 100,
a and c are each independently an integer of 0 to 2, and
b and d are each independently an integer of 1 to 3.

$R_9$, $R_{10}$, and $R_{11}$ are each independently an aliphatic hydrocarbon group or an aromatic hydrocarbon group,
$R_e$, $R_f$, $R_g$, and $R_h$ are each independently hydrogen or an alkyl group having 1 to 3 carbon atoms,
o, p, and q are the numbers of repeating units,
wherein o is an integer of 1 to 100,
p is an integer of 1 to 100, and
q is an integer of 1 to 100,
a1 and c1 are each independently an integer of 0 to 2, and
b1 and d1 are each independently an integer of 1 to 3.
In this case, in the oligomers represented by Formula 1 and Formula 2, R', R", $R_9$, $R_{10}$, and $R_{11}$ may each independently be at least one aliphatic hydrocarbon group selected from the group consisting of an alicyclic hydrocarbon group and a linear hydrocarbon group.
The alicyclic hydrocarbon group may include at least one selected from the group consisting of a substituted or unsubstituted cycloalkylene group having 4 to 20 carbon atoms; a substituted or unsubstituted cycloalkenylene group having 4 to 20 carbon atoms; and a substituted or unsubstituted heterocycloalkylene group having 2 to 20 carbon atoms.

[Formula 2]

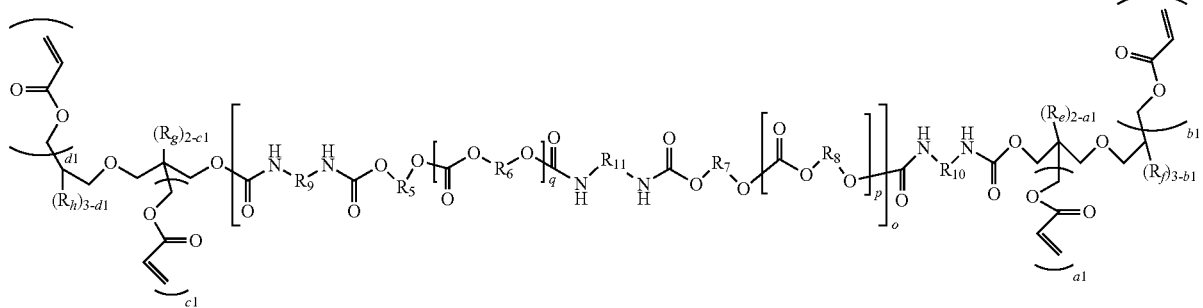

In Formula 2,
$R_5$, $R_6$, $R_7$, and $R_8$ are each independently a substituted or unsubstituted alkylene group having 1 to 10 carbon atoms, a substituted or unsubstituted cycloalkylene group having 4 to 20 carbon atoms, a substituted or unsubstituted arylene group having 6 to 20 carbon atoms, a substituted or unsubstituted heterocycloalkylene group having 2 to 20 carbon atoms, —CO—

The linear hydrocarbon group may include at least one selected from the group consisting of a substituted or unsubstituted alkylene group having 1 to 20 carbon atoms; a substituted or unsubstituted alkoxylene group having 1 to 20 carbon atoms; a substituted or unsubstituted alkenylene group having 2 to 20 carbon atoms; and a substituted or unsubstituted alkynylene group having 2 to 20 carbon atoms.

Also, in the oligomers represented by Formula 1 and Formula 2, R', R", $R_9$, $R^{10}$, and $R_{11}$ may be aromatic hydrocarbon groups.

The aromatic hydrocarbon group may include at least one selected from the group consisting of a substituted or unsubstituted arylene group having 6 to 20 carbon atoms; and a substituted or unsubstituted heteroarylene group having 4 to 20 carbon atoms.

Specifically, in the oligomer represented by Formula 1, R' and R" may be aliphatic hydrocarbon groups, and $R_1$ and $R_2$ may each independently be a substituted or unsubstituted alkylene group having 2 to 8 carbon atoms, a substituted or unsubstituted cycloalkylene group having 4 to 10 carbon atoms, a substituted or unsubstituted arylene group having 6 to 15 carbon atoms, a substituted or unsubstituted heterocycloalkylene group having 2 to 10 carbon atoms, —CO—O—R— (where R is an alkylene group having 2 to 8 carbon atoms), —$R_o$—CO— (where $R_o$ is an alkylene group having 2 to 8 carbon atoms), or —$R_3$—O—$R_4$— (where $R_3$ and $R_4$ are each independently a substituted or unsubstituted alkylene group having 1 to 8 carbon atoms).

More specifically, in the oligomer represented by Formula 1, $R_1$ and $R_2$ may each independently be at least one selected from the group consisting of a propylene group, a butylene group, a pentylene group, a hexylene group, a heptylene group, a cyclopentylene group, a cyclohexylene group, —CO—O—$(CH_2)_5$—, —$(CH_2CH_2OCH_2CH_2)_r$— (where r is an integer of 1 to 10), —$(CH_2)_2$—CO—, —$(CH_2)_3$—CO—, —$(CH_2)_4$—CO—, —$(CH_2)_5$—CO—, and —$(CH_2)_6$—CO—, wherein $R_1$ and $R_2$ may be the same or different from each other.

Furthermore, in the oligomer represented by Formula 1, a molar ratio of n:m, which are the numbers of repeating units, may be in a range of 1:0.01 to 1:100, for example, 1:0.1 to 1:50.

In a case in which the molar ratio of m, as the number of repeating units, to 1 mol of n, as the number of repeating units, is 0.01 or more, efficiency of dissociating the lithium (Li) salt may be improved to ensure excellent ionic conductivity, and, in a case in which the molar ratio of m, as the number of repeating units, to 1 mol of n, as the number of repeating units, is 100 or less, contact characteristics with respect to the electrode may be improved to suppress an increase in interfacial resistance during cell configuration.

Specifically, the oligomer represented by Formula 1 may include at least one selected from the group consisting of oligomers represented by Formula 1a to Formula 1c below, and may preferably include the oligomer represented by Formula 1a below.

[Formula 1a]

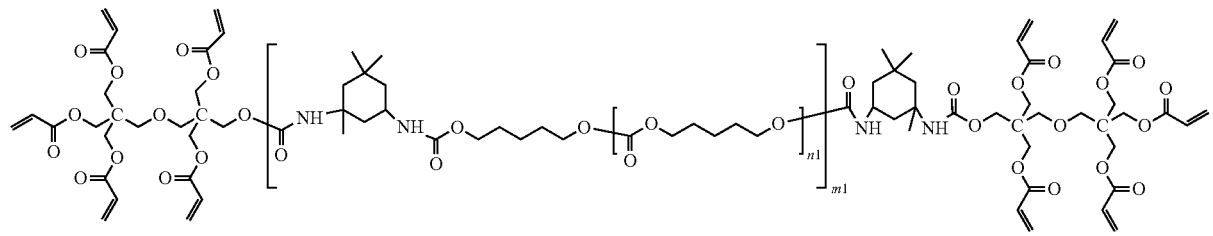

In Formula 1a,
n1 is an integer of 1 to 100, and
m1 is an integer of 1 to 100.

[Formula 1b]

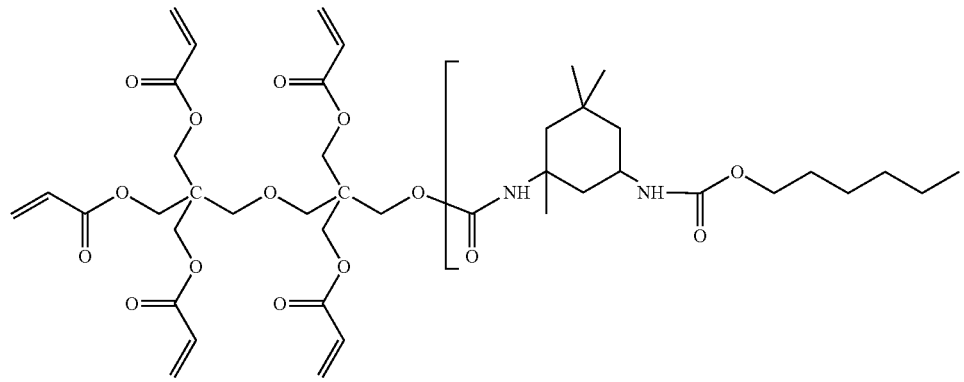

-continued

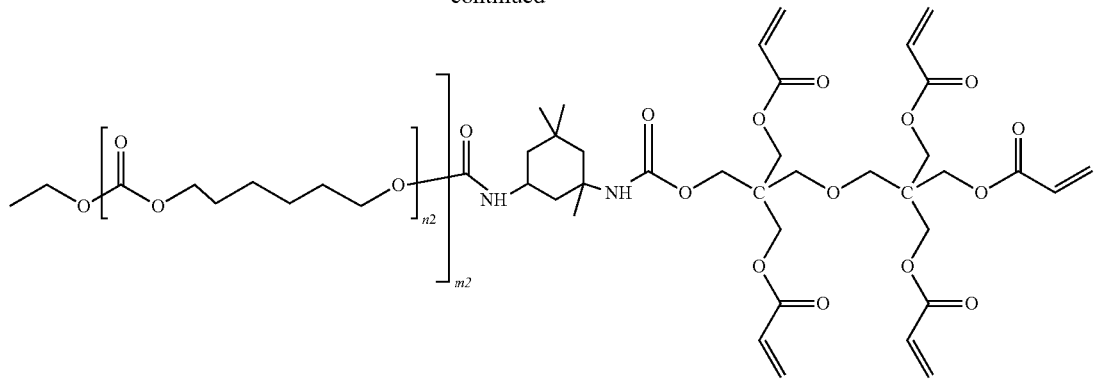

In Formula 1b,
n2 is an integer of 1 to 100, and
m2 is an integer of 1 to 100.

[Formula 1c]

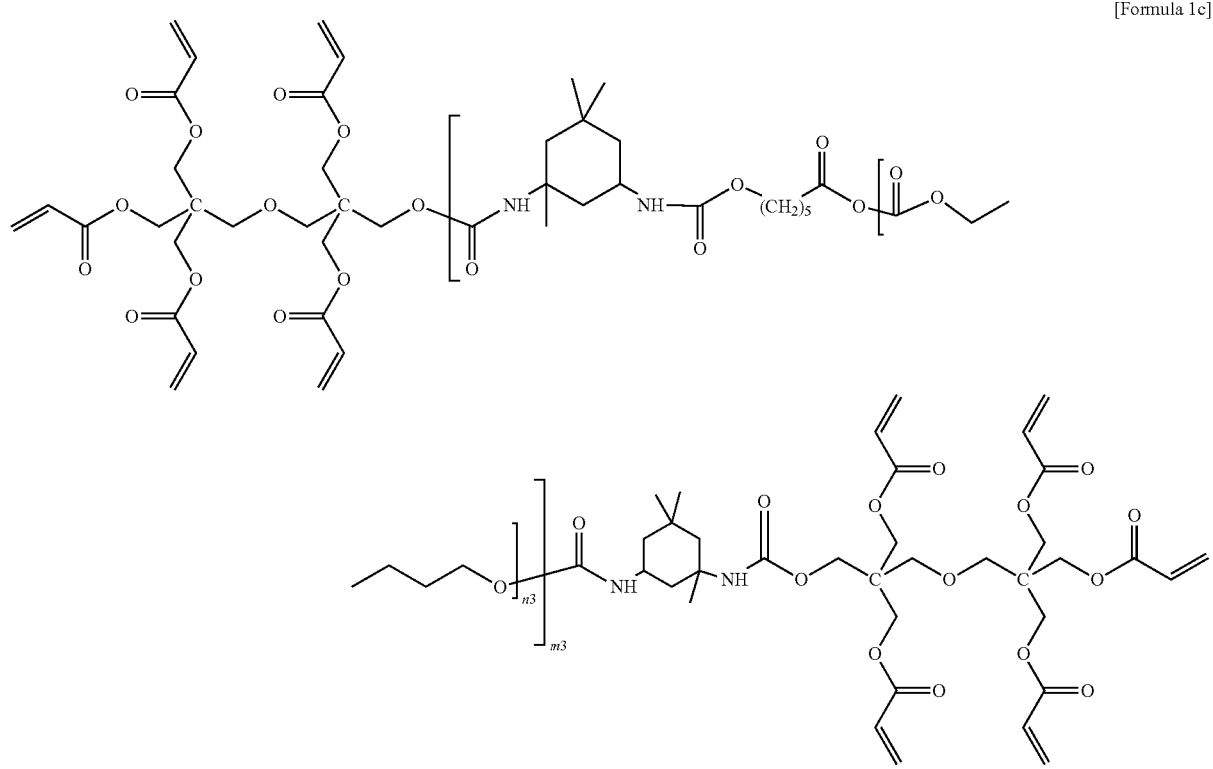

In Formula 1c,
n3 is an integer of 1 to 100, and
m3 is an integer of 1 to 100.

Also, in the oligomer represented by Formula 2, $R_5$, $R_6$, $R_7$, and $R_8$ may each independently be a substituted or unsubstituted alkylene group having 2 to 8 carbon atoms, a substituted or unsubstituted cycloalkylene group having 4 to 10 carbon atoms, a substituted or unsubstituted arylene group having 6 to 15 carbon atoms, a substituted or unsubstituted heterocycloalkylene group having 2 to 10 carbon atoms, —CO—O—$R_j$— (where $R_j$ is an alkylene group having 2 to 8 carbon atoms), —$R_k$—CO— (where $R_k$ is an alkylene group having 2 to 8 carbon atoms), or —$R_{12}$—O—$R_{13}$ (where $R_{12}$ and $R_{13}$ are each independently a substituted or unsubstituted alkylene group having 1 to 8 carbon atoms), and $R_9$, $R_{10}$, and $R_{11}$ may be aliphatic hydrocarbon groups.

More specifically, in the oligomer represented by Formula 2, $R_5$, $R_6$, $R_7$ and $R_8$ may each independently be at least one selected from the group consisting of a propylene group, a butylene group, a pentylene group, a hexylene group, a heptylene group, a cyclopentylene group, a cyclohexylene group, —CO—O—$(CH_2)_5$—, —$(CH_2CH_2OCH_2CH_2)_r$— (where r is an integer of 1 to 10), —$(CH_2)_2$—CO—, —$(CH_2)_3$—CO—, —$(CH_2)_4$—CO—, —$(CH_2)_5$—CO—, and —$(CH_2)_6$—CO—, wherein $R_5$, $R_6$, $R_7$, and $R_8$ may be the same or different from each other.

Furthermore, in the oligomer represented by Formula 2, a molar ratio of (p+q):o, which are the numbers of repeating units, may be in a range of 1:0.01 to 1:100, for example, 1:0.1 to 1:50.

Also, a molar ratio of q:p, which are the numbers of repeating units, may be in a range of 1:0.11 to 1:9, for example, 1:0.5 to 1:8.

In a case in which the molar ratio of o, as the number of repeating units, to 1 mol of (p+q), as the number of repeating units, is 0.01 or more, the efficiency of dissociating the lithium (Li) salt may be improved to ensure excellent ionic conductivity, and, in a case in which the molar ratio of o, as the number of repeating units, to 1 mol of (p+q), as the number of repeating units, is 100 or less, the contact characteristics with respect to the electrode may be improved to suppress the increase in interfacial resistance during cell configuration. Also, in a case in which the molar ratio of p, as the number of repeating units, to 1 mol of q, as the number of repeating units, is 9 or less, a polymerization reaction rate may be improved.

Specifically, the oligomer represented by Formula 2 may include a compound represented by Formula 2a below.

process is not required, a polymer electrolyte formation process may be facilitated. If the weight-average molecular weight of the oligomer is 1,500,000 g/mol or less, since the affinity with the electrolyte solvent is increased by preventing physical properties of the oligomer itself from being rigid, dissolution is easy, and thus, the formation of a uniform polymer electrolyte may be expected.

The weight-average molecular weight may be measured by gel permeation chromatography (GPC) using 1200 series by Agilent Technologies. For example, a sample having a predetermined concentration is prepared, and Alliance 4, a GPC measurement system, is then stabilized. When the system is stabilized, a standard sample and the sample are injected into the system to obtain a chromatogram, and a molecular weight may then be calculated according to an analytical method (system: Alliance 4, column: PL mixed B by Agilent Technologies, eluent: 0.1M $NaNO_3$ (pH 7.0 phosphate buffer, flow rate: 0.1 mL/min, solvent: tetrahydrofuran (THF), temp: 40° C., injection: 100 μL).

Also, the polymerizable oligomer may include each of the oligomer represented by Formula 1 and the oligomer represented by Formula 2 alone, or may include a mixture of these oligomers.

[Formula 2a]

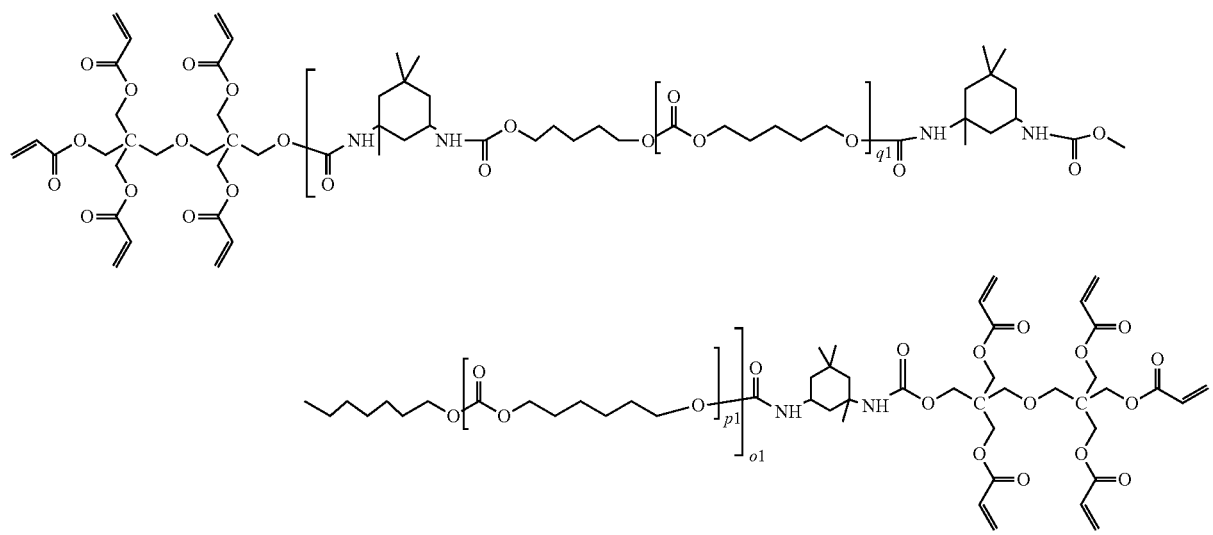

In Formula 2a,
o1 is an integer of 1 to 100,
p1 is an integer of 1 to 100, and
q1 is an integer of 1 to 100.

A weight-average molecular weight (MW) of each of the oligomers represented by Formula 1 and Formula 2 may be controlled by the number of repeating units, and may be in a range of about 1,000 g/mol to about 1,500,000 g/mol, particularly 1,000 g/mol to 500,000 g/mol, and more particularly 1,000 g/mol to 100,000 g/mol. In a case in which the weight-average molecular weights of the oligomers are within the above range, mechanical strengths of polymer electrolytes including the same may be effectively improved.

That is, if the weight-average molecular weight of the oligomer represented by Formula 1 or Formula 2 is 1,000 g/mol or more, since excellent mechanical strength may be ensured and the use of a greater amount of the polymerization initiator or a demanding additional polymerization In a case in which the oligomer represented by Formula 1 and the oligomer represented by Formula 2 are mixed and included as the polymerizable oligomer, the oligomer represented by Formula 1 and the oligomer represented by Formula 2 may be included in a weight ratio of 1:99 to 99:1, for example, 50:50 to 99:1.

With respect to a polymer having a skeleton of alkylene oxide which has been used during the preparation of a conventional polymer electrolyte, since reduction stability is low, a film, which is easily broken at high temperature, is formed on a surface of a negative electrode during initial charge. The film is disadvantageous in that it causes a side reaction to increase interfacial resistance between the electrode and the electrolyte. Also, in a case in which a main chain of a polymer or oligomer includes a skeleton composed of an ethylene group substituted with a fluorine element as represented by Formula 3 below, since solubility with respect to the organic solvent used in the composition for a polymer electrolyte is low, phase non-uniformity may be caused to form a non-uniform film, and thus, resistance of the polymer electrolyte may be increased.

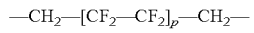 [Formula 3]

(In Formula 3, p is an integer of 1 to 100)

In contrast, with respect to the polymerizable oligomer included in the composition for a polymer electrolyte of the present invention, since an acrylate group, as a hydrophilic part, and a urethane group are present together in its structure, the interfacial resistance may be reduced by acting as a surfactant in the battery. Furthermore, since the oligomer of the present invention may exhibit a balanced affinity for a hydrophilic part (positive electrode, separator (SRS layer)) and a hydrophobic part (negative electrode, separator fabric) in the battery by including a polycarbonate group as a repeating unit in the structure, it is not only possible to form a homogeneous (solid) polymer electrolyte, but affinity with the electrode may also be improved to expect an excellent cell performance.

With respect to a polymer electrolyte including a matrix polymer formed by polymerization of the oligomer having such structure, since a side reaction between the electrolyte and the electrode is suppressed by increasing adhesion between parts in the electrode and, additionally, a uniform solid electrolyte interface (SEI) may be formed through the affinity with the electrode, overall stability, for example, resistance, high-temperature stability, and overcharge of the battery may be improved.

(4) Polymerization Initiator

The polymerization initiator used during the preparation of the composition for a polymer electrolyte is to perform a radical reaction required during the preparation of the polymer electrolyte, wherein a conventional thermal or photo-polymerization initiator known in the art may be used. For example, the polymerization initiator forms a radical by being decomposed by heat, and may react with the oligomer represented by Formula 1 by free radical polymerization to form a polymer electrolyte.

Specifically, non-limiting examples of the polymerization initiator may be organic peroxides or hydroperoxides, such as benzoyl peroxide, acetyl peroxide, dilauryl peroxide, di-tert-butyl peroxide, t-butyl peroxy-2-ethyl-hexanoate, cumyl hydroperoxide, and hydrogen peroxide, and one or more azo compounds selected from the group consisting of 2,2'-azobis(2-cyanobutane), 2,2'-azobis(methylbutyronitrile), 2,2'-azobis(iso-butyronitrile) (AIBN), and 2,2'-azobis-dimethyl-valeronitrile (AMVN), but the polymerization initiator is not limited thereto.

The polymerization initiator forms a radical by being decomposed by heat, for a non-limiting example, heat at 30° C. to 100° C. in the battery or by being decomposed at room temperature (5° C. to 30° C.), and the polymerizable oligomer may react with an acrylate-based compound by free radical polymerization to form a polymer electrolyte.

Also, the polymerization initiator may be included in an amount of 0.01 part by weight to 20 parts by weight, for example, 0.1 part by weight to 10 parts by weight based on 100 parts by weight of the polymerizable oligomer.

In a case in which a polymerization initiator is included during the preparation of the composition for a polymer electrolyte, the polymerization initiator is usually decomposed to initiate a chain polymerization reaction when drying and curing are performed on the composition for a polymer electrolyte, and the polymerization initiator is then removed while a part of the polymerization initiator is converted into gas, wherein a trace amount of some residues of the polymerization initiator remaining without decomposition and removal may also be included in the prepared polymer electrolyte.

Thus, in order to prevent a side reaction and an increase in resistance caused by the polymer initiator, the use of an excessive amount of the polymerization initiator is avoided, and the polymerization initiator may specifically be used in an amount of 20 parts by weight or less, for example, 10 parts by weight or less based on 100 parts by weight of the oligomer.

That is, in a case in which the polymerization initiator is included in an amount of 20 parts by weight or less, for example, 10 parts by weight or less, since polymerization rate may be controlled in the polymer electrolyte, a disadvantage that the unreacted polymerization initiator remains and adversely affects battery performance later may be prevented.

Polymer Electrolyte

Also, in the present invention, a polymer electrolyte formed by polymerization of the composition for a polymer electrolyte is provided.

The polymer electrolyte of the present invention may be prepared by a conventional method. For example, (i) after preparing the composition for a polymer electrolyte of the present invention which includes the lithium salt, the organic solvent, the polymerization initiator, and the polymerizable oligomer, the polymer electrolyte may be prepared by coating the composition for a polymer electrolyte on surfaces of an electrode and a separator which are formed and then dying and performing polymerization. Also, (ii) after the composition for a polymer electrolyte of the present invention is contained in a porous membrane such as polyolefin, the polymer electrolyte may be prepared by drying and curing the composition, (iii) after the composition for a polymer electrolyte of the present invention is coated on a support, dried and cured, the polymer electrolyte may be prepared by separating from the support, or (iv) the polymer electrolyte may be a free-standing polymer electrolyte prepared by forming the composition for a polymer electrolyte itself into a film. The polymer electrolyte of the present invention may be a solid polymer electrolyte.

Furthermore, various methods, for example, compositing by further adding ceramic particles, or compositing with a polymer electrolyte component conventionally used, may be applied to the polymer electrolyte of the present invention when the composition for a polymer electrolyte is coated, is contained in the porous membrane, or is formed into the film.

In a case in which the composition for a polymer electrolyte is coated on a positive electrode and/or a negative electrode, or a support, it is desirable to coat the composition to a thickness of about 20 μm to about 40 μm. In a case in which the thickness is less than 20 μm, pin holes may occur, and, in a case in which the thickness is greater than 40 μm, resistance may be increased and energy density may be reduced due to the thick electrolyte.

It is desirable that the drying and curing processes may be performed at 30° C. or more in order to dry and remove the solvent included in the composition for a polymer electrolyte.

Also, the drying and curing processes may be performed by heat or ultraviolet (UV) irradiation for an additional crosslinking reaction during the drying and curing processes. For example, the drying and curing processes may be performed in a temperature range of 45° C. to 300° C., for example, 60° C. to 250° C. In a case in which the drying and curing processes are performed within the above temperature range, the removal of the organic solvent, as a dispersion medium, may be easy. In this case, the drying and curing may be performed for 30 minutes to 3 hours.

A polymer electrolyte having good binding ability and high ionic conductivity under non-pressurized conditions may be prepared by the above method.

A unit derived from the polymerizable oligomer in the polymer electrolyte may be included in an amount of 10 wt % to 90 wt %, particularly 20 wt % to 80 wt %, and more particularly 40 wt % to 80 wt % based on a total weight of the polymer electrolyte.

If the amount of the unit derived from the polymerizable oligomer is included within the above range, a polymer network having excellent mechanical strength and ionic conductivity may be formed, and, furthermore, an all-solid secondary battery having improved oxidation stability and ionic conductivity may be prepared.

Specifically, if the unit derived from the polymerizable oligomer in the polymer electrolyte is included in an amount of 10 wt % or more, for example, 20 wt % or more, a polymer electrolyte having improved mechanical strength may be prepared. Also, if the unit derived from the polymerizable oligomer in the polymer electrolyte is included in an amount of 90 wt % or less, for example, 80 wt % or less, disadvantages, such as an increase in resistance and a restriction of the movement of lithium ions, for example, a decrease in ionic conductivity, due to the excessive amount of the unit derived from the polymerizable oligomer may be prevented. If, in a case in which the amount of the unit derived from the polymerizable oligomer is greater than 80 wt %, the ionic conductivity of the polymer electrolyte may be significantly reduced.

In order to prevent the composition for a polymer electrolyte from being decomposed during the preparation of the polymer electrolyte of the present invention to cause collapse of a negative electrode in a high output environment, or further improve low-temperature high-rate discharge characteristics, high-temperature stability, overcharge protection, high-temperature swelling improvement, resistance reduction, lifetime improvement, and gas reduction effect, the composition for a polymer electrolyte of the present invention may further include additional additives, if necessary.

Specific examples of the additional additive may include at least one first additive selected from the group consisting of a sultone-based compound, a sulfite-based compound, a sulfone-based compound, a sulfate-based compound, a halogen-substituted carbonate-based compound, a nitrile-based compound, a cyclic carbonate-based compound, a phosphate-based compound, a borate-based compound, and a lithium salt-based compound.

The sultone-based compound may include at least one compound selected from the group consisting of 1,3-propane sultone (PS), 1,4-butane sultone, ethane sultone, 1,3-propene sultone (PRS), 1,4-butene sultone, and 1-methyl-1,3-propene sultone, and may be included in an amount of 0.3 wt % to 5 wt %, for example, 1 wt % to 5 wt % based on a total weight of the composition for a polymer electrolyte. In a case in which the amount of the sultone-based compound in the composition for a polymer electrolyte is greater than 5 wt %, an excessively thick film may be formed on the surface of the electrode to cause an increase in resistance and a degradation of output, and resistance due to the excessive amount of the additive in the composition for a polymer electrolyte may be increased to degrade output characteristics.

The sulfite-based compound may include at least one compound selected from the group consisting of ethylene sulfate, methylethylene sulfite, ethylethylene sulfite, 4,5-dimethylethylene sulfite, 4,5-diethylethylene sulfite, propylene sulfite, 4,5-dimethylpropylene sulfite, 4,5-diethylpropylene sulfite, 4,6-dimethylpropylene sulfite, 4,6-diethylpropylene sulfite, and 1,3-butylene glycol sulfite, and may be included in an amount of 3 wt % or less based on the total weight of the composition for a polymer electrolyte.

The sulfone-based compound may include at least one compound selected from the group consisting of divinyl sulfone, dimethyl sulfone, diethyl sulfone, methylethyl sulfone, and methylvinyl sulfone, and may be included in an amount of 3 wt % or less based on the total weight of the composition for a polymer electrolyte.

The sulfate-based compound may include ethylene sulfate (Esa), trimethylene sulfate (TMS), or methyl trimethylene sulfate (MTMS), and may be included in an amount of 3 wt % or less based on the total weight of the composition for a polymer electrolyte.

Also, the halogen-substituted carbonate-based compound may include fluoroethylene carbonate (FEC), and may be included in an amount of 5 wt % or less based on the total weight of the composition for a polymer electrolyte. In a case in which the amount of the halogen-substituted carbonate-based compound in the composition for a polymer electrolyte is greater than 5 wt %, cell swelling inhibition performance may be degraded.

Furthermore, the nitrile-based compound may include at least one compound selected from the group consisting of succinonitrile, adiponitrile (Adn), acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The cyclic carbonate-based compound may include vinylene carbonate (VC) or vinyl ethylene carbonate, and may be included in an amount of 3 wt % or less based on the total weight of the composition for a polymer electrolyte. In a case in which the amount of the cyclic carbonate-based compound in the composition for a polymer electrolyte is greater than 3 wt %, cell swelling inhibition performance may be degraded.

The phosphate-based compound may include at least one compound selected from the group consisting of lithium difluoro (bisoxalato)phosphate, lithium difluorophosphate, tetramethyl trimethyl silyl phosphate, trimethylsilyl phosphate, and tris(2,2,2-trifluoroethyl)phosphate, and may be included in an amount of 3 wt % or less based on the total weight of the composition for a polymer electrolyte.

The borate-based compound may include lithium oxalyldifluoroborate, and may be included in an amount of 3 wt % or less based on the total weight of the composition for a polymer electrolyte.

The lithium salt-based compound is a compound different from the lithium salt included in the composition for a polymer electrolyte, wherein the lithium salt-based compound may include at least one compound selected from the group consisting of $LiPO_2F_2$, LiODFB, LiBOB (lithium bis(oxalato)borate ($LiB(C_2O_4)_2$)), and $LiBF_4$, and may be included in an amount of 3 wt % or less based on the total weight of the composition for a polymer electrolyte.

Two types or more of the additional additives may be mixed and included in an amount of 20 wt % or less, for example, 0.1 wt % to 10 wt % based on the total weight of the composition for a polymer electrolyte. If the amount of the additional additive is less than 0.01 wt %, effects of improving low-temperature output, high-temperature storage characteristics, and high-temperature life characteristics of the battery are insignificant, and, if the amount of the additional additive is greater than 20 wt %, there is a possibility that a side reaction in the composition for a polymer electrolyte occurs excessively during charge and discharge of the battery. Particularly, since the additives may not be sufficiently decomposed at high temperatures, the additives may be present in the form of an unreacted material or precipitates in the composition for a polymer electrolyte at room temperature. Accordingly, a side reaction may occur in which life or resistance characteristics of the secondary battery are degraded.

Lithium Secondary Battery

Furthermore, in the present invention, a lithium secondary battery including the polymer electrolyte prepared by the above method may be prepared. The lithium secondary battery may be an all-solid secondary battery.

The lithium secondary battery of the present invention is not particularly limited, but may be prepared according to a conventional method known in the art, and may specifically be prepared by sequentially stacking a positive electrode, the polymer electrolyte prepared by the above method, and a negative electrode.

In this case, those prepared by typical methods during the preparation of a lithium secondary battery may be used as the positive electrode, the negative electrode, and a separator which constitute an electrode assembly.

(1) Positive Electrode

The positive electrode may be prepared by forming a positive electrode material mixture layer on a positive electrode collector. The positive electrode material mixture layer may be prepared by coating the positive electrode collector with a positive electrode active material slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. More specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), etc.), lithium-manganese-cobalt-based oxide (e.g., $LiCo_{1-Y2}Mn_{Y2}O_2$ (where $0<Y2<1$), $LiMn_{2-Z1}Co_{z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}Co_{q2}Mn_{r3}M_{s2})$ $O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, and $Li(Ni_{0.8}Mn_{0.1}Co_{0.1})O_2$), or lithium nickel cobalt aluminum oxide (e.g., $LiNi_{0.8}CO_{0.15}Al_{0.05}O_2$, etc.).

The positive electrode active material may be included in an amount of 80 wt % to 99 wt % based on a total weight of solid content in the positive electrode active material slurry.

The binder is a component that assists in the binding between the active material and the conductive agent and in the binding with the current collector, wherein the binder is commonly added in an amount of 1 wt % to 30 wt % based on the total weight of the solid content in the positive electrode active material slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene termonomer (EPDM), a sulfonated EPDM, a styrene-butadiene rubber, a fluoro rubber, various copolymers, and the like.

The conductive agent is commonly added in an amount of 1 wt % to 30 wt % based on the total weight of the solid content in the positive electrode active material slurry.

The conductive agent is not particularly limited as long as it has conductivity without causing adverse chemical changes in the battery, and, for example, a conductive material, such as: carbon powder such as carbon black, acetylene black (or Denka black), Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include an organic solvent, such as N-methyl-2-pyrrolidone (NMP), and may be used in an amount such that desirable viscosity is obtained when the positive electrode active material as well as optionally the binder and the conductive agent are included. For example, the solvent may be included in an amount such that a concentration of the solid content in the slurry including the positive electrode active material as well as optionally the binder and the conductive agent is in a range of 50 wt % to 95 wt %, for example, 70 wt % to 90 wt %.

(2) Negative Electrode

Also, the negative electrode may be prepared by forming a negative electrode material mixture layer on a negative electrode collector. The negative electrode material mixture layer may be formed by coating the negative electrode collector with a slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, $Bi_2O_5$, $Li_xFe_2O_3$ ($0 \leq x \leq 1$), $Li_xWO_2$ ($0 \leq x \leq 1$), and $Sn_xMe_{1-x}Me'_yO_z$ (Me: manganese (Mn), Fe, Pb, or Ge; Me': Al, boron (B), phosphorus (P), Si, Groups I, II and III elements of the periodic table, or halogen; $0 < x \leq 1$; $1 \leq y \leq 3$; $1 \leq z \leq 8$) may be used as the metal composite oxide.

The material, which may be doped and undoped with lithium, may include Si, $SiO_x$ ($0 < x \leq 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubnium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene polymer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. One, which is the same as or different from the conductive agent used during the preparation of the positive electrode, may be used as the conductive agent, and, for example, a conductive material, such as: carbon powder such as carbon black, acetylene black (or Denka black), Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as optionally the binder and the conductive agent are included. For example, the solvent may be included in an amount such that a concentration of the solid content including the negative electrode active material as well as optionally the binder and the conductive agent is in a range of 50 wt % to 95 wt %, for example, 70 wt % to 90 wt %.

(3) Separator

Also, the separator plays a role in blocking an internal short circuit between both electrodes and impregnating the electrolyte, wherein, after mixing a polymer resin, a filler, and a solvent to prepare a separator composition, the separator composition is directly coated on the electrode and dried to form a separator film, or, after the separator composition is cast on a support and dried, the separator may be prepared by laminating a separator film peeled from the support on the electrode.

A typically used porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

In this case, the porous separator may generally have a pore diameter of 0.01 μm to 50 μm and a porosity of 5% to 95%. Also, the porous separator may generally have a thickness of 5 μm to 300 μm.

The lithium secondary battery of the present invention may be an all-solid battery in which the polymer electrolyte of the present invention is used as an electrolyte in a solid form, instead of a liquid or gel polymer electrolyte used in a conventional lithium secondary battery.

Since the all-solid secondary battery does not use a flammable solvent in the battery, it is chemically stable and simultaneously does not generate fire or explosion due to a leakage or a decomposition reaction of a conventional electrolyte solution, and thus, safety may be significantly improved. Also, since a Li metal or Li alloy may be used as a negative electrode material, it is advantageous in that energy density with respect to mass and volume of the battery may be significantly improved. Furthermore, it is advantageous in that it is suitable for high energy density by stacking of the electrode and the polymer electrolyte.

A shape of the lithium secondary battery of the present invention is not particularly limited, but a cylindrical type using a can, a prismatic type, a pouch type, or a coin type may be used.

EXAMPLES

Example 1

(Preparation of Polymer Electrolyte Solution)

A non-aqueous organic solvent was prepared by dissolving LiFSI in N-methyl-2-pyrrolidone (NMP) to have a concentration of 1 M. A composition for a polymer electrolyte was prepared by adding 10 g of the oligomer represented by Formula 1a (weight-average molecular weight (Mw) 23,000, $n1=16$, $m1=22$) and 0.5 g of AIBN, as a polymerization initiator, to 89.5 g of the non-aqueous organic solvent (see Table 1 below).

Example 2

(Preparation of Polymer Electrolyte Solution)

A composition for a polymer electrolyte was prepared in the same manner as in Example 1 except that the oligomer represented by Formula 1b (weight-average molecular weight (Mw) 25,000, $n2=16$, $m2=21$) was included instead of the oligomer represented by Formula 1a (see Table 1 below).

Example 3

(Preparation of Polymer Electrolyte Solution)

A composition for a polymer electrolyte was prepared in the same manner as in Example 1 except that the oligomer represented by Formula 1c (weight-average molecular weight (Mw) 22,000, $n3=6$, $m3=22$) was included instead of the oligomer represented by Formula 1a (see Table 1 below).

Example 4

(Preparation of Polymer Electrolyte Solution)

A composition for a polymer electrolyte was prepared in the same manner as in Example 1 except that the oligomer represented by Formula 2a (weight-average molecular weight (Mw) 26,000, $o1=22$, $p1=8$, $q1=8$) was included instead of the oligomer represented by Formula 1a (see Table 1 below).

Comparative Example 1

A composition for a polymer electrolyte was prepared in the same manner as in Example 1 except that trimethylolpropane ethoxylate triacrylate was used instead of the compound of Formula 1a (see Table 1 below).

Comparative Example 2

A composition for a polymer electrolyte was prepared in the same manner as in Example 1 except that trimethylolpropane propoxylate triacrylate was used instead of the compound of Formula 1a (see Table 1 below).

Comparative Example 3

A composition for a polymer electrolyte was prepared in the same manner as in Example 1 except that dipentaerythritol pentaacrylate was used instead of the compound of Formula 1a (see Table 1 below).

Comparative Example 4

A composition for a polymer electrolyte was prepared in the same manner as in Example 1 except that polyethylene oxide (PEO, weight-average molecular weight (Mw)=100,000) was used instead of the compound of Formula 1a (see Table 1 below).

TABLE 1

| | Non-aqueous organic solvent amount (g) | Oligomer | | | Polymerization initiator amount (g) |
|---|---|---|---|---|---|
| | | Type | Weight-average molecular weight (Mw) | Amount (g) | |
| Example 1 | 89.5 | Oligomer of Formula 1a | 23,000 | 10 | 0.5 |
| Example 2 | 89.5 | Oligomer of Formula 1b | 25,000 | 10 | 0.5 |
| Example 3 | 89.5 | Oligomer of Formula 1c | 22,000 | 10 | 0.5 |
| Example 4 | 89.5 | Oligomer of Formula 2a | 26,000 | 10 | 0.5 |
| Comparative Example 1 | 89.5 | Trimethylolpropane ethoxylate triacrylate | — | 10 | 0.5 |

TABLE 1-continued

| | Non-aqueous organic solvent amount (g) | Oligomer Type | Weight-average molecular weight (Mw) | Amount (g) | Polymerization initiator amount (g) |
|---|---|---|---|---|---|
| Comparative Example 2 | 89.5 | Trimethylolpropane propoxylate triacrylate | — | 10 | 0.5 |
| Comparative Example 3 | 89.5 | Dipentaerythritol pentaacrylate | — | 10 | 0.5 |
| Comparative Example 4 | 89.5 | Polyethylene oxide | 100,000 | 10 | 0.5 |

EXPERIMENTAL EXAMPLES

Experimental Example 1: Oxidation Stability Evaluation Test

Electrochemical (oxidation) stabilities of the compositions for a polymer electrolyte prepared in Examples 1 to 4 and the compositions for a polymer electrolyte prepared in Comparative Examples 3 and 4 were measured using linear sweep voltammetry (LSV).

The measurement was made by using a potentiostat (EG&G, model 270A) under a three-electrode system (working electrode: platinum disk, counter electrode: platinum, reference electrode: lithium metal), and measurement temperature was 60° C. The results thereof are presented in Table 2 below.

TABLE 2

| | Oxidation stability (V) @60° C. |
|---|---|
| Example 1 | 4.48 |
| Example 2 | 4.47 |
| Example 3 | 4.45 |
| Example 4 | 4.46 |
| Comparative Example 3 | 4.40 |
| Comparative Example 4 | 3.90 |

As illustrated in Table 2, since the compositions for a polymer electrolyte prepared in Examples 1 to 4 of the present invention had an oxidation initiation voltage of about 4.45 V or more, it was confirmed that the compositions for a polymer electrolyte prepared in Examples 1 to 4 exhibited excellent electrochemical (oxidation) stabilities.

In contrast, with respect to the compositions for a polymer electrolyte of Comparative Examples 3 and 4, it may be understood that oxidation initiation voltages were about 4.40 V or less, which was lower than those of compositions for a polymer electrolyte of Examples 1 to 4.

Experimental Example 2. Ionic Conductivity Measurement

Solid specimens were prepared by using the compositions for a polymer electrolyte of Examples 1 to 4 and the compositions for a polymer electrolyte of Comparative Examples 1 to 4. The specimens were collectively prepared according to ASTM standard D638 (Type V specimens).

Subsequently, a circular gold (Au) electrode having a diameter of 1 mm was coated on the specimens using a sputtering method, and ionic conductivity was measured at room temperature (25° C.) by using an alternating current impedance method.

The ionic conductivity was measured in a frequency range of 0.1 Hz to 100 MHz using a VMP3 measurement instrument and a precision impedance analyzer (4294A), and the measurement results are presented in Table 3 below.

TABLE 3

| | 25° C., Ionic conductivity (mS/cm) |
|---|---|
| Example 1 | 0.12 |
| Example 2 | 0.11 |
| Example 3 | 0.13 |
| Example 4 | 0.11 |
| Comparative Example 1 | 0.08 |
| Comparative Example 2 | 0.07 |
| Comparative Example 3 | 0.06 |
| Comparative Example 4 | 0.03 |

Referring to Table 3, it may be understood that an ionic conductivity of 0.11 mS/cm or more was achieved for the solid specimens prepared by using the compositions for a polymer electrolyte of Examples 1 to 4.

In contrast, since the solid specimens, which were prepared by using the compositions for a polymer electrolyte of Comparative Examples 1 to 3, had low dielectric properties and compactness of a network structure, it may be understood that the ionic conductivities were lower than those of the solid specimens of Examples 1 to 4. Also, with respect to the solid specimen prepared by using the composition for a polymer electrolyte of Comparative Example 4, it may be understood that the ionic conductivity was lower than those of the solid specimens of Examples 1 to 4 at room temperature due to a polyethylene oxide structure having a semi-crystalline structure at room temperature.

The invention claimed is:

1. A composition for a polymer electrolyte, the composition comprising:
   a lithium salt, an organic solvent, a polymerization initiator, and a polymerizable oligomer,
   wherein the polymerizable oligomer comprises at least one of an oligomer represented by Formula 1 or an oligomer represented by Formula 2:

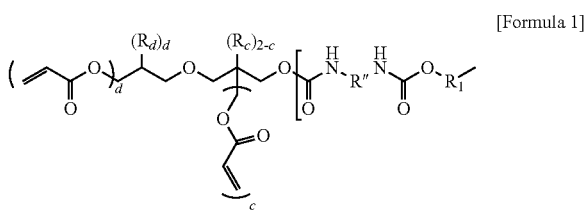

[Formula 1]

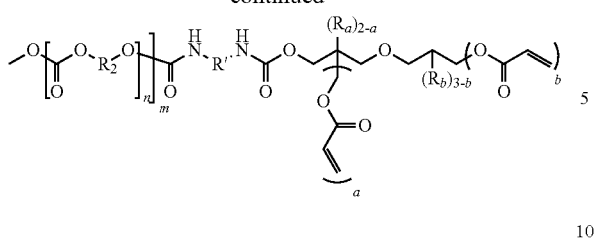

wherein, in Formula 1,

R' and R" are each independently an aliphatic hydrocarbon group or an aromatic hydrocarbon group, $R_1$ and $R_2$ are each independently a substituted or unsubstituted alkylene group having 1 to 10 carbon atoms, a substituted or unsubstituted cycloalkylene group having 4 to 20 carbon atoms, a substituted or unsubstituted arylene group having 6 to 20 carbon atoms, a substituted or unsubstituted heterocycloalkylene group having 2 to 20 carbon atoms, —CO—O—R—, where R is an alkylene group having 1 to 10 carbon atoms, —$R_o$—CO—, where $R_o$ is an alkylene group having 1 to 10 carbon atoms, or —$R_3$—O—$R_4$—, where $R_3$ and $R_4$ are each independently a substituted or unsubstituted alkylene group having 1 to 10 carbon atoms, $R_a$, $R_b$, $R_c$, and $R_d$ are each independently hydrogen or an alkyl group having 1 to 3 carbon atoms, n is an integer of 1 to 100, and m is an integer of 1 to 100, a and c are each independently an integer of 0 to 2, and b and d are each independently an integer of 1 to 3,

[Formula 2]

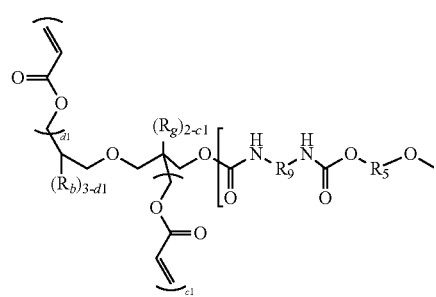

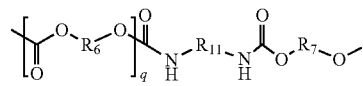

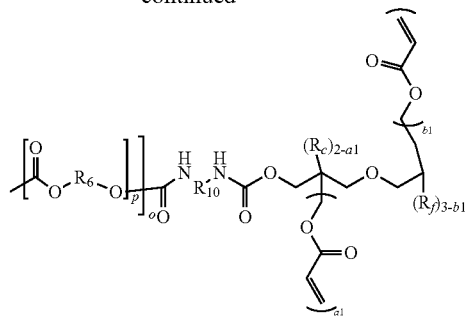

wherein, in Formula 2, $R_5$, $R_6$, $R_7$, and $R_8$ are each independently a substituted or unsubstituted alkylene group having 1 to 10 carbon atoms, a substituted or unsubstituted cycloalkylene group having 4 to 20 carbon atoms, a substituted or unsubstituted arylene group having 6 to 20 carbon atoms, a substituted or unsubstituted heterocycloalkylene group having 2 to 20 carbon atoms, —CO—O—$R_j$, where $R_j$ is an alkylene group having 1 to 10 carbon atoms, —$R_k$—CO—, where $R_k$ is an alkylene group having 1 to 10 carbon atoms, or —$R_{12}$—O—$R_{13}$—, where $R_{12}$ and $R_{13}$ are each independently a substituted or unsubstituted alkylene group having 1 to 10 carbon atoms, $R_9$, $R_{10}$, and $R_{11}$ are each independently an aliphatic hydrocarbon group or an aromatic hydrocarbon group, $R_e$, $R_f$, $R_g$, and $R_h$ are each independently hydrogen or an alkyl group having 1 to 3 carbon atoms, o is an integer of 1 to 100, p is an integer of 1 to 100, and q is an integer of 1 to 100, a1 and c1 are each independently an integer of 0 to 2, and b1 and d1 are each independently an integer of 1 to 3.

2. The composition for a polymer electrolyte of claim 1, wherein, in Formula 1, R' and R" are aliphatic hydrocarbon groups, and $R_1$ and $R_2$ each independently comprises at least one selected from the group consisting of a substituted or unsubstituted alkylene group having 2 to 8 carbon atoms, a substituted or unsubstituted cycloalkylene group having 4 to 10 carbon atoms, a substituted or unsubstituted arylene group having 6 to 15 carbon atoms, a substituted or unsubstituted heterocycloalkylene group having 2 to 10 carbon atoms, —CO—O—R—, where R is an alkylene group having 2 to 8 carbon atoms, —$R_o$—CO—, where $R_o$ is an alkylene group having 2 to 8 carbon atoms, and —$R_3$—O—$R_4$—, where $R_3$ and $R_4$ are each independently a substituted or unsubstituted alkylene group having 1 to 8 carbon atoms.

3. The composition for a polymer electrolyte of claim 1, wherein, in Formula 1, $R_1$ and $R_2$ each independently comprises at least one selected from the group consisting of a propylene group, a butylene group, a pentylene group, a hexylene group, a heptylene group, a cyclopentylene group, a cyclohexylene group, —CO—O—$(CH_2)_5$—, —$(CH_2CH_2OCH_2CH_2)_r$—, where r is an integer of 1 to 10, —$(CH_2)_2$—CO—, —$(CH_2)_3$—CO—, —$(CH_2)_4$—CO—, —$(CH_2)_5$—CO—, and —$(CH_2)_6$—CO—.

4. The composition for a polymer electrolyte of claim 1, wherein the oligomer represented by Formula 1 comprises at least one selected from the group consisting of oligomers represented by Formula 1a to Formula 1c:

[Formula 1a]
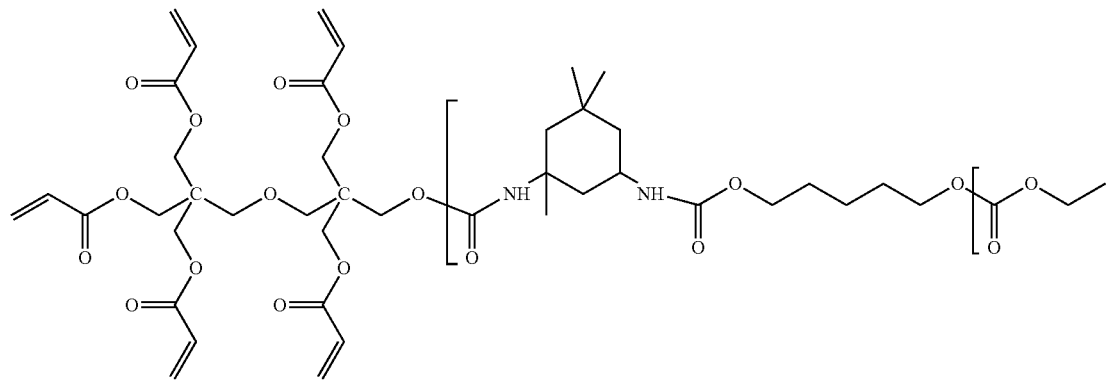
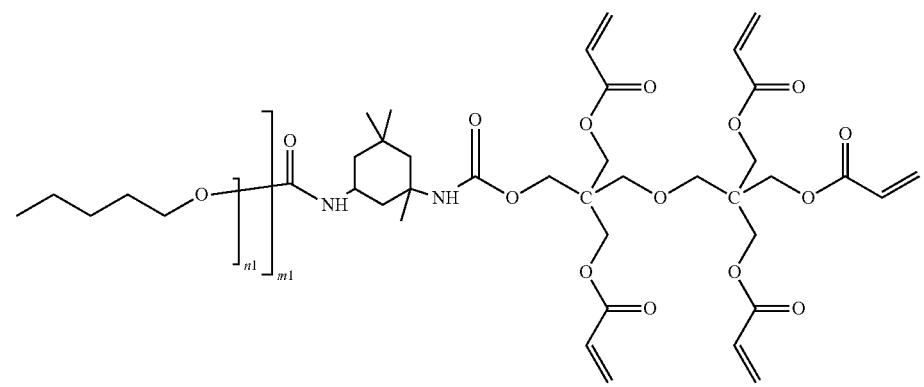
wherein, in Formula 1a,
n1 is an integer of 1 to 100, and
m1 is an integer of 1 to 100,
[Formula 1b]
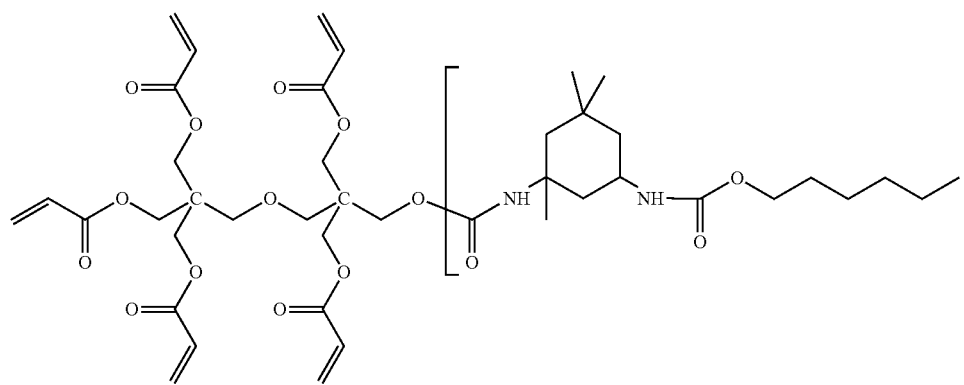

-continued

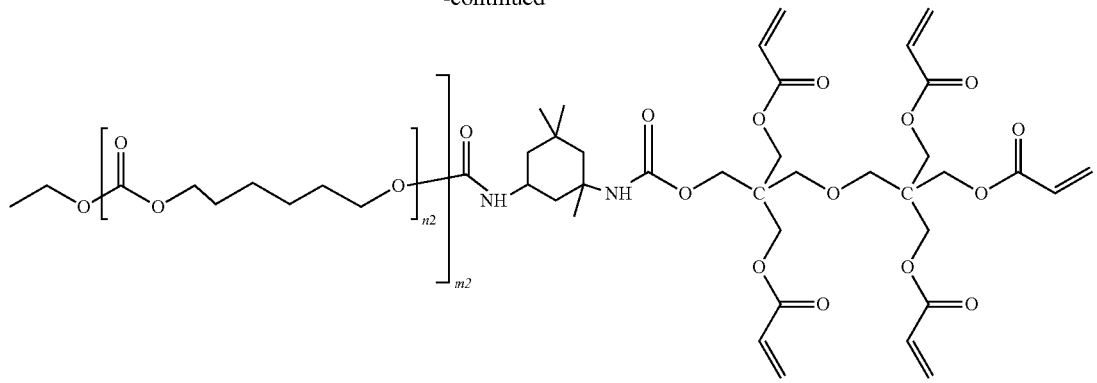

wherein, in Formula 1b,
n2 is an integer of 1 to 100, and
m2 is an integer of 1 to 100,

[Formula 1c]

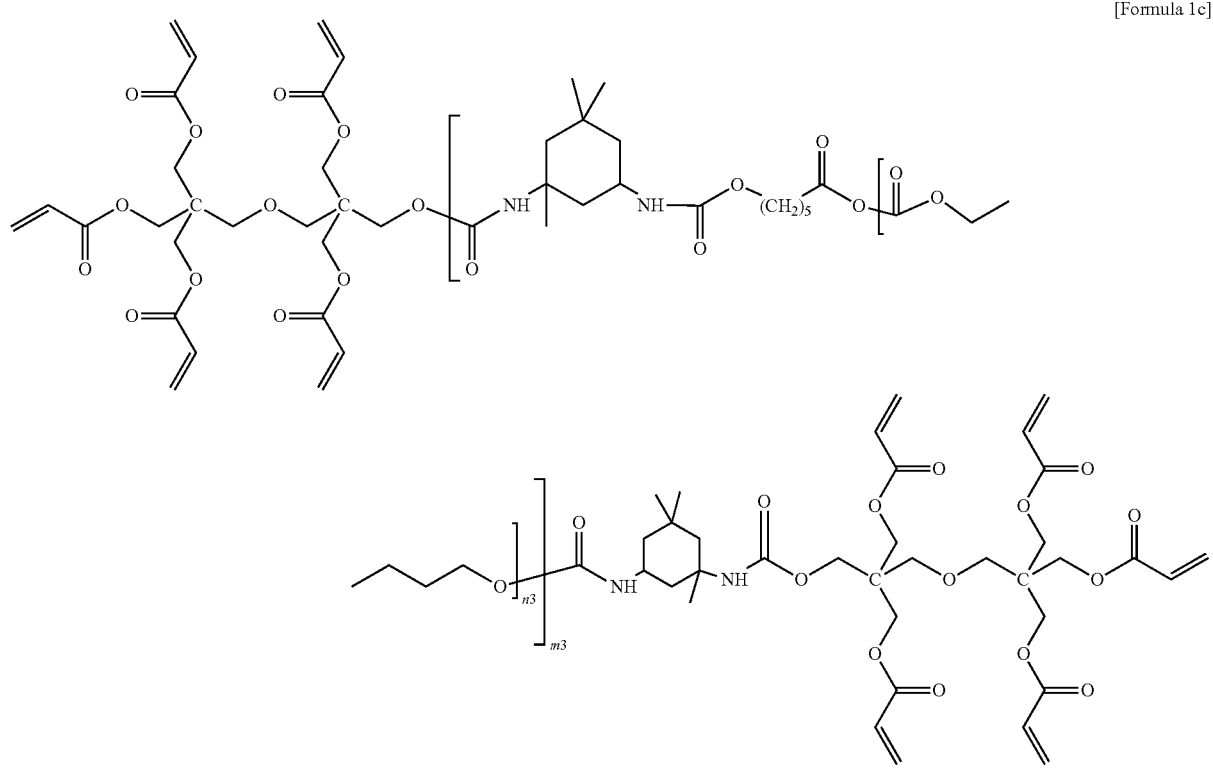

wherein, in Formula 1c,
n3 is an integer of 1 to 100, and
m3 is an integer of 1 to 100.

5. The composition for a polymer electrolyte of claim 4, wherein the oligomer represented by Formula 1 comprises the oligomer represented by Formula 1a.

6. The composition for a polymer electrolyte of claim 1, wherein, in Formula 2, $R_5$, $R_6$, $R_7$, and $R_8$ each independently comprises at least one selected from the group consisting of a substituted or unsubstituted alkylene group having 2 to 8 carbon atoms, a substituted or unsubstituted cycloalkylene group having 4 to 10 carbon atoms, a substituted or unsubstituted arylene group having 6 to 15 carbon atoms, a substituted or unsubstituted heterocycloalkylene group having 2 to 10 carbon atoms, —CO—O—$R_j$—, where $R_j$ is an alkylene group having 2 to 8 carbon atoms, —$R_k$—CO—, where $R_k$ is an alkylene group having 2 to 8 carbon atoms, and —$R_{12}$—O—$R_{13}$—, where $R_{12}$ and $R_{13}$ are each independently a substituted or unsubstituted alkylene group having 1 to 8 carbon atoms, and $R_9$, $R_{10}$, and $R_{11}$ are aliphatic hydrocarbon groups.

7. The composition for a polymer electrolyte of claim 1, wherein, in Formula 2, $R_5$, $R_6$, $R_7$, and $R_8$ each independently comprises at least one selected from the group consisting of a propylene group, a butylene group, a pentylene group, a hexylene group, a heptylene group, a cyclopentylene group, a cyclohexylene group, —CO—O—$(CH_2)_5$—, —$(CH_2CH_2OCH_2CH_2)_r$—, where r is an integer of 1 to 10, —$(CH_2)_2$—CO—, —$(CH_2)_3$—CO—, —$(CH_2)_4$—CO—, —$(CH_2)_5$—CO—, and —$(CH_2)_6$—CO—.

8. The composition for a polymer electrolyte of claim 1, wherein the oligomer represented by Formula 2 comprises a compound represented by Formula 2a:

[Formula 2a]

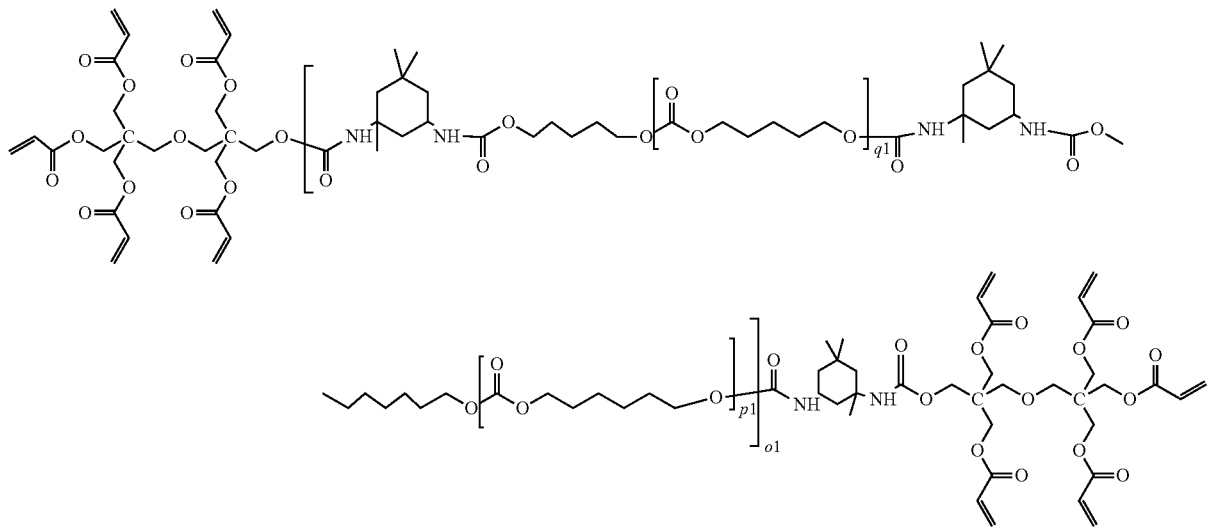

wherein, in Formula 2a,
o1 is an integer of 1 to 100,
p1 is an integer of 1 to 100, and
q1 is an integer of 1 to 100.

9. A polymer electrolyte comprising a polymerized compound for a polymer electrolyte of claim 1.

10. A lithium secondary battery comprising:
a positive electrode including a positive electrode active material;
a negative electrode including a negative electrode active material;
a separator disposed between the negative electrode and the positive electrode; and
the polymer electrolyte of claim 9.

* * * * *